June 6, 1967   J. DORNEY   3,323,210
HAND SHEARS, SCISSORS AND OTHER HAND TOOLS
Filed Jan. 4, 1965   2 Sheets-Sheet 1

INVENTOR
John Dorney
BY Smith, Michael Bradford
& Gardiner
ATTORNEY

June 6, 1967 J. DORNEY 3,323,210
HAND SHEARS, SCISSORS AND OTHER HAND TOOLS
Filed Jan. 4, 1965 2 Sheets-Sheet 2

INVENTOR
John Dorney
BY
ATTORNEY

United States Patent Office 3,323,210
Patented June 6, 1967

3,323,210
HAND SHEARS, SCISSORS AND OTHER
HAND TOOLS
John Dorney, Holyport, England, assignor to Wilkinson
Sword Limited, London, England, a British company
Filed Jan. 4, 1965, Ser. No. 422,944
Claims priority, application Great Britain, Jan. 4, 1964,
468/64; Oct. 10, 1964, 41,436/64
7 Claims. (Cl. 30—248)

This invention relates to hand shears, scissors and other hand tools.

In particular, this invention relates to tools of the kind comprising two co-operating members which are relatively movable about a connecting pivot under the control of associated handles for effecting a cutting, shearing or other pivotal action.

According to the present invention there is provided a hand tool comprising a pair of pivotally connected members, a handle associated with each member movable relatively to the other handle in a direction normal to the direction of relative movement of the members, and a coupling mechanism between the handles and the members, the coupling mechanism comprising abutment surfaces for transmitting force from the handles to the members during one stroke of the blades and resilient means for effecting the other stroke, the abutment faces of the coupling mechanism being disposed eccentrically with respect to the pivotal connection of the members.

Two embodiments of grass-cutting shears in accordance with the invention will now be described, by way of example, with reference to the accompanying diagrammatic drawings, in which.

Figure 1:
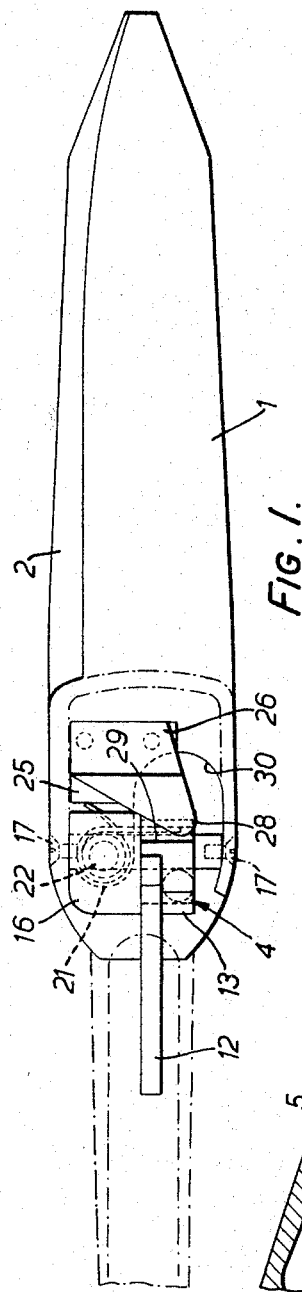
FIGURE 1 is a plan view of one embodiment of the shears with certain parts omitted.
Figure 2:
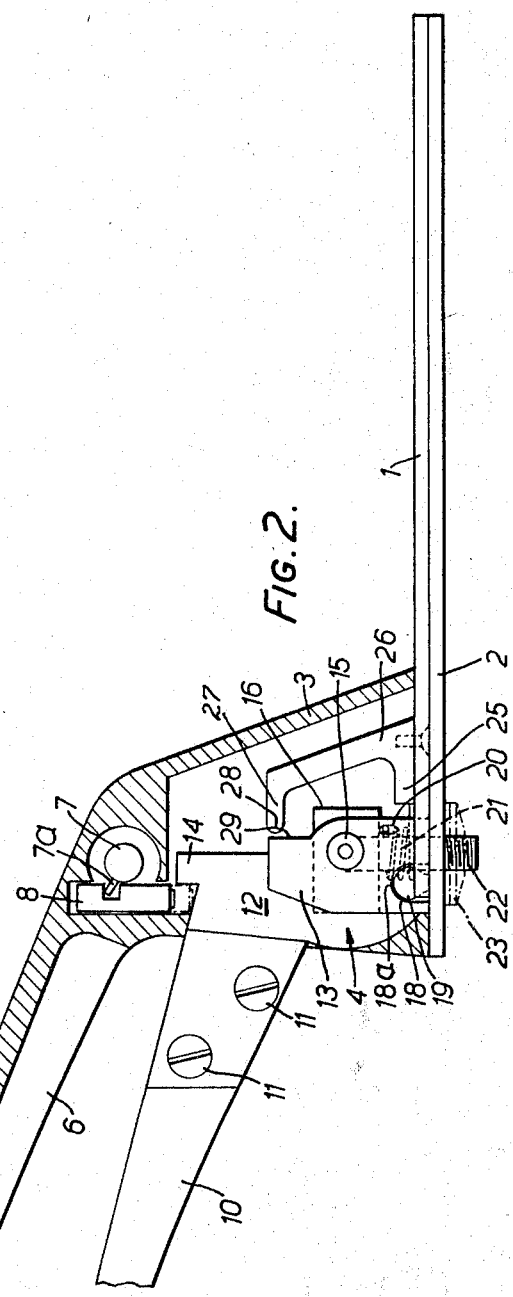
FIGURE 2 is a side elevation, partly in section, of the shears of FIGURE 1.

Referring now to the drawings, and in particular to FIGURES 1 and 2, a pair of grass-cutting shears in accordance with the invention includes an upper cutting blade 1 and a lower cutting blade 2. Part of the upper blade 1 extends beneath a housing 3 which also covers a coupling mechanism denoted generally by the reference 4. The housing 3 is integral with a handle 5 having an elongate recess 6 in its lower surface. The upper part of the housing 3 is formed with two intersecting perpendicular bores which accommodate a spindle 7 with a radial projection 7A and a pin 8 of a catch mechanism. The coupling mechanism 4 serves to transmit and transform a hand gripping action on a lower or movable handle 10 relative to the upper or fixed handle 5 into shearing or cutting motion by both of the blades. The movable handle 10 is secured by screws 11 to an integral member including a plate section 12, part of which is held between a bifurcated end of the movable handle 10, and a pivotal arm 13. The plate section 12 has an upstanding projection 14 which is arranged to co-operate with the pin 8 of the catch mechanism. The arm 13 is pivotally-mounted on a pin 15 which passes through a block 16 and extends parallel to the plane of movement of the cutting edges of the blades 1, 2. At each end, the pin 15 is secured to the housing 3 by screws 17 (shown in broken lines in FIGURE 1). The arm 13 is bifurcated at its end 18 adjacent the upper surface of the blade 2 and engages a round-headed peg 19 rigid with that blade by an abutment surface 18A. The pivotal arm 13 also has an elongate aperture 20 which accommodates a projecting end of a coil spring 21 (shown in broken lines in FIGURES 1 and 2).

The coil spring 21 is disposed around a pivot pin 22 of the blades 1, 2. The pivot pin 22 is screw-threaded at its lower end which passes through the lower blade 2 and is secured by a flat nut 23 and a multi-tab washer (not shown), one of the tabs being bent over to engage in a peripheral slot or castellation of the nut in order to lock the pivot pin 22. The upper end of the pivot pin 22 extends into the block 16.

Another projecting end of the coil spring 21 abuts against one leg 25 of a channel-section member 26 which is rigid with the upper blade 1. The other leg 27 of the channel-section member has a rounded nose 28 which engages against an abutment surface 29 of the pivotal arm. Both legs of the member 26 lie parallel to one another and to the blades 1, 2, whilst the interconnecting part of the channel extends parallel to a sloping portion of the housing 3.

The upper blade 1 has a semi-circular aperture 30 at the end adjacent the coupling 4 to avoid interference between the upper blade 1 and the bifurcated end 18 of the pivotal arm 13.

In operation, the movable handle 10 is moved by a gripping action of an operator's hand towards and away from the fixed handle 5, this motion causing the arm 13 to pivot about the pin 15. In turn the bifurcated end 18 of the arm causes the peg 19 and the blade 2 to make an arcuate movement about the pivot pin 22 of the blades 1, 2. The abutment surface 29 of the pivotal arm acts against the nose 28 of the channel-section member and thus causes the blade 1 to pivot about the pin 22. Both the blades 1 and 2 are therefore constrained to make a shearing action. At the same time, the lower blade 2 is constrained to maintain a proper set in relation to the blade 1 because a downwards force is exerted on the lower blade 2 by the abutment surface of the bifurcated end through the peg 19 which is secured to the blade on the opposite side of the pivot pin 22 to the cutting edge of the blade. Correspondingly a downwardly directed force is exerted by the abutment surface 29 on the upper blade 1 through the channel-section member 26 which lies on the opposite side of the pivot pin 22 to the peg 19.

When a cutting or shearing operation has been completed the catch mechanism spindle 7 is turned by a knob (not shown) so that the radial projection 7A moves the pin 8 downwardly until it engages between the upstanding projection 14 and the inner surface of the housing 3.

The embodiment of a pair of shears described with reference to FIGURES 1 and 2, includes a catch mechanism which simply allows the blades either to be free for relative movement or serves to lock the blades relatively to one another.

Figure 3:
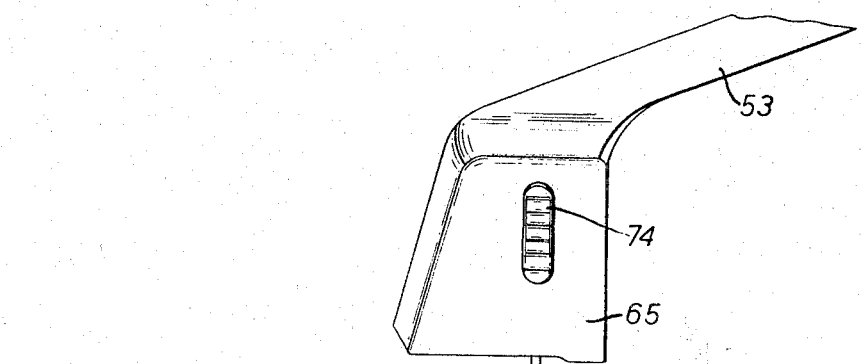
FIGURE 3 is a fragmentary exploded view of a second embodiment of grass-cutting shears in accordance with the invention.
Figure 4:
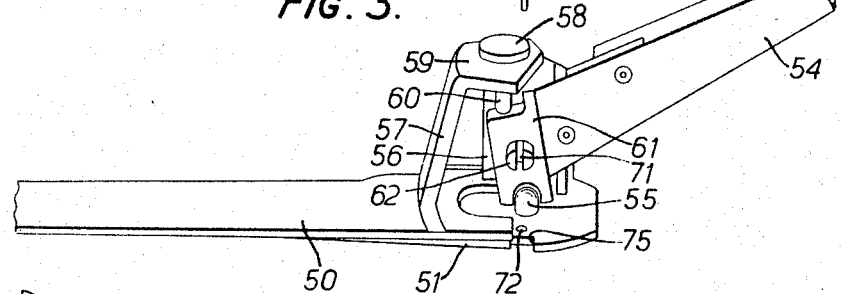
FIGURE 4 is a fragmentary perspective view of the embodiment of FIGURE 3 but viewed from the opposite side.
Figure 4:
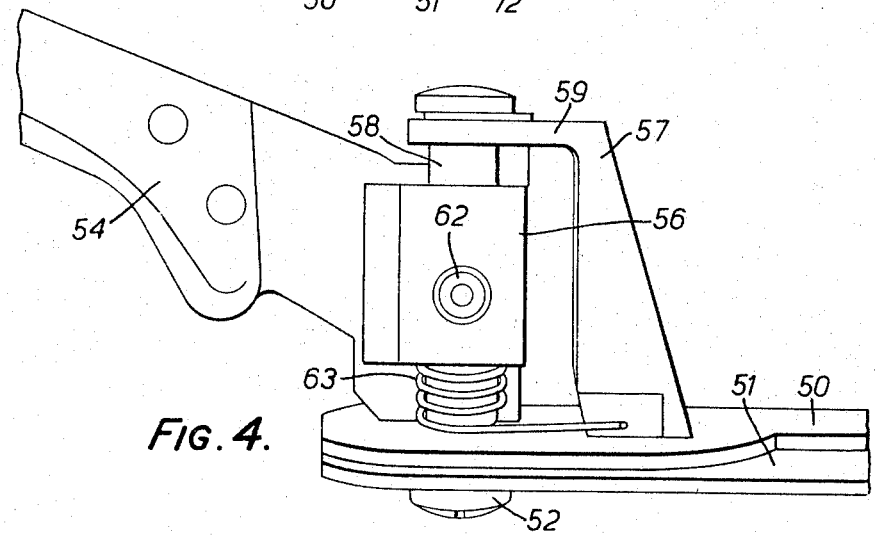

In the embodiment of FIGURES 3 and 4 a grass-cutting shears comprises two elongated shear blades 50, 51 pivotally mounted for movement towards and away from each other to effect a shearing action. This movement is effected, through a mechanical coupling, in response to a gripping action of the hand, in a direction perpendicular to this movement, on a fixed handle 53 and a movable handle 54 pivotally mounted on this fixed handle.

The mechanical coupling is so designed that movement of the pivotally mounted handle 54 applies a force substantially in the longitudinally-extending direction of the blades effecting a turning moment in a "horizontal" plane on these blades together with a moment in a "vertical" plane tending to keep the two blades together during their movement.

The upper blade 50 has at its rearward end an aperture (not shown) accommodating a pivot pin 52 and has a slot in juxtaposition therewith and extending towards the operative part of the blade from this end. The lower blade 51 likewise has an aperture (not shown) accommodating this pivot pin and in addition has a peg 55 which protrudes through the slot in the upper blade.

The pivot pin 52 extends downwardly from a supporting block 56 rigid with the fixed handle 53 and conveniently comprises a screw, the head of which abuts the lower blade. In turn, the upper blade 50 has secured thereto an angle bracket 57 the upper side of which is pivotally mounted, by a further pivot pin, likewise in the form of a screw 58, to the upper side of the supporting block 56, the two screws 52, 58 having aligned axes.

The upper leg 59 of the angle bracket has a peg 60 extending downwardly therefrom, spaced from the axis of the pivot pins 52 and 58 and lying at the same radial distance therefrom as the peg 55 in the lower blade. The movable handle 54 is provided at its inner end with an arm 61 pivotally movable about a pivot pin 62 extending from the supporting block 56 transversely of the length of the handles and lying in a plane parallel to that in which the cutting edges of the blades move. The lower end of this arm 61 is bifurcated and engages by an abutment surface with the peg 55 secured to the lower blade 51 and the upper end of the arm 61 is arranged to abut the peg 60 secured to the angle bracket 57. The upper and lower blades are spring-biassed by a coil spring 63 into their open position so as normally to ensure that the upper end of the arm 61 abuts its associated peg 60.

The fixed handle 53 has a housing 65 at its inner end which encloses the coupling mechanism, the housing 65 being secured to the supporting block 56 by screws (not shown). Thus, movement of the movable handle 54 towards the fixed handle 53, and away from the fixed handle—by reason of the restoring action of the spring 63—will "oscillate" the arm 61 about its axis and effect a closing and opening movement of the blades. At the same time, a vertical force component tends to keep the two blades 50, 51 together, the upper blade 50 being pushed downwardly about pivot 52 by the force applied in one direction to its peg 60, above its cutting edge, and the lower blade 51 being pushed upwardly about pivot 52 by the force applied to its peg 55 in the opposite direction.

The spring-biassing means may alternatively or additionally comprise a coil spring 70 engaged in a slot 71 in the end of the exial shaft, the spring having two outwardly extending ends, one engaging in a recess (not shown) in the upper side of the angle bracket and the other engaging in a hole 72 in the lower blade 51.

The catch mechanism of this embodiment is effective for the following action:
 (1) Both blades to be freely movable relatively to both handles;
 (2) The upper blade to be locked; and
 (3) Both blades to be locked in the closed position.

These purposes are effected by a rod 73 which is secured to a finger catch 74 which, in the closed position of the blades, may be depressed into a notch 75 in the side of the lower blade 51 and abut the end of the upper blade 50 thus preventing movement of both blades or may be released from the notch 75 whilst still abutting the end of the upper blade 50, thus permitting movement of the lower blade. Both blades are freed when the catch 74 is raised so as to lift the end of the rod 73 above both blades.

The operation of this embodiment is substantially the same as the embodiment of FIGURES 1 and 2 and will not be further described.

The invention is not limited to shears of the form particularly described and illustrated. For example the peg and slot arrangements may be interchanged, that is, a peg may extend from the arm secured to the movable handle and a slot may be provided in a block upstanding from the lower blade.

Moreover, the invention is applicable not only to hand tools for shearing or cutting but to other hand tools having pivotally connected co-operating members.

I claim:
1. A hand tool comprising
 a pair of pivotally connected members,
 a pivotal connection between the members,
 a handle associated with each member movable relatively to the other handle in a direction substantially normal to the direction of movement of the members, and
 a coupling mechanism operative between the handles and the members,
 the coupling mechanism comprising means defining abutment surfaces for transmitting force from the handles to the members during one stroke of the blades and resilient means for effecting the other stroke,
 the abutment surfaces of the coupling mechanism being disposed eccentrically with respect to the pivotal connection of the members and spaced apart in a direction normal to the direction of movement of the members, whereby the interaction of the abutment surfaces causes the members to be forced towards one another in said normal direction.

2. A hand tool comprising
 a pair of pivotally-connected blades,
 a pivotal connection between the blades,
 a first handle which is fixed relative to the blades in a direction normal to the plane of movement of the blades,
 a second handle which is pivotally movable in a direction normal to the plane of movement of the blades about an axis lying parallel to the plane of movement of the blades,
 means rigid with the second handle defining two abutment surfaces,
 means rigid with one of the blades defining an abutment surface which co-operates with one of the abutment surfaces rigid with the pivotal handle, and
 means rigid with the other of the blades defining an abutment surface which co-operates with the other abutment surface of the pivotal handle,
 the abutment surfaces being disposed eccentrically in relation to the pivotal connection of the blades and spaced apart in a direction normal to the direction of movement of the blades, whereby the interaction of the abutment surfaces causes the blades to be forced towards one another in said normal direction, and
 pivotal movement of the pivotal handle about the pivotal axis thereof causing a force applied to the pivotal handle to be transmitted through the abutment surfaces to the blades.

3. A hand tool according to claim 2, comprising
 a bracket upstanding from the said one of the blades, which bracket includes the said means rigid with one of the blades defining an abutment surface.

4. A hand tool according to claim 2 comprising
 a support block secured to the said first handle, and
 a pivot pin mounted in the block defining the pivotal axis of the second handle.

5. A hand tool according to claim 2, comprising resilient means biasing the blades to an open position.

6. A pair of grass-cutting shears comprising a pair of pivotally-connected blades,
 a pivotal connection between the blades,
 a first handle which is fixed relative to the blades in a direction normal to the plane of movement of the cutting edges of the blades,
 a second handle which is pivotally movable relative to the blades in a direction normal to the plane of movement of the blades about an axis lying parallel to the plane of movement of the blades,
an arm secured to the second handle,
a pivot pin passing through the arm which defines the pivotal axis of the second handle
a bracket upstanding from one of the blades,
a peg secured to the other of the blades, and
a spring acting to bias the blade apart,
the arm being mounted eccentrically in relation to the pivotal connection and having an abutment surface disposed on each side of the pivot pin,
one of the abutment surfaces being in engagement with an abutment surface of the bracket and
the other one of the abutment surfaces being in engagement with an abutment surface of the peg,
pivotal movement of the second handle causing forces to be transmitted through the abutment surfaces to the blades to effect a closing movement thereof and
the spring acting to effect an opening movement of the blades.

7. A hand tool comprising
a pair of pivotally connected members,
a pivotal connection between the members,
a handle associated with each member movable relatively to the other handle in a direction substantially normal to the direction of movement of the members, and
a coupling mechanism operative between the handles and the members,
the coupling mechanism comprising means defining abutment surfaces for transmitting force from the handles to the members during one stroke of the members,
resilient means for effecting the other stroke,
a manually-operable catch,
a pin fast with the catch,
a projection on the pin,
a further pin having a slot therein in engagement with the projection of the first pin,
a projection rigid with the other handle,
the projection rigid with the other handle being engaged by the said further pin by operation of the manually-operable catch to lock the blades in at least one of their extreme positions, and
the abutment surfaces of the coupling mechanism being disposed eccentrically with respect to the pivotal connection of the members, and spaced apart in a direction normal to the direction of movement of the members, whereby the interaction of the abutment surfaces causes the members to be forced towards one another in said normal direction.

References Cited
UNITED STATES PATENTS

| | | | |
|---|---|---|---|
| 756,227 | 4/1904 | Fisk | 30—248 XR |
| 1,962,636 | 6/1934 | Clark | 30—248 |
| 1,987,375 | 1/1935 | Simonsen et al. | 30—248 |
| 2,519,174 | 8/1950 | Caves | 30—248 XR |

FOREIGN PATENTS 1,119,586  12/1961  Germany.

WILLIAM FELDMAN, *Primary Examiner.*

J. C. PETERS, *Assistant Examiner.*